(12) United States Patent
Poisner

(10) Patent No.: US 8,098,046 B2
(45) Date of Patent: *Jan. 17, 2012

(54) BATTERY CHARGING APPARATUS HAVING A CHUTE AND METHOD OF RECHARGING A BATTERY

(75) Inventor: David Poisner, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/771,610

(22) Filed: Apr. 30, 2010

(65) Prior Publication Data

US 2010/0201307 A1    Aug. 12, 2010

Related U.S. Application Data

(63) Continuation of application No. 11/478,336, filed on Jun. 30, 2006, now Pat. No. 7,723,951.

(51) Int. Cl.
*H02J 7/00*        (2006.01)
(52) U.S. Cl. ........ 320/112; 320/106; 320/107; 320/128; 320/137
(58) Field of Classification Search ............ 320/112, 320/107
See application file for complete search history.

(56) References Cited

U.S. PATENT DOCUMENTS

| | | | |
|---|---|---|---|
| 5,539,297 | A | 7/1996 | Fiebig |
| 5,544,784 | A | 8/1996 | Malaspina |
| 2001/0020838 | A1 | 9/2001 | Malackowski |
| 2002/0011519 | A1 | 1/2002 | Shults, III |
| 2006/0214629 | A1* | 9/2006 | Tsai et al. ................. 320/112 |
| 2006/0220611 | A1* | 10/2006 | Choi ........................ 320/112 |
| 2007/0008141 | A1 | 1/2007 | Sweetland |

FOREIGN PATENT DOCUMENTS

| | | |
|---|---|---|
| CN | 1079079 A | 12/1993 |
| JP | 09-153376 A | 6/1997 |
| JP | 2001-266954 A | 9/2001 |
| JP | 2006-172884 A | 6/2006 |

(Continued)

OTHER PUBLICATIONS

Japanese Office Action with English translation corresponding to Japanese Application No. 2009-518564, mailed Jan. 18, 2011.
Chinese Office Action with English translation corresponding to Chinese Application No. 200780019659.X, dated Dec. 7, 2010.

(Continued)

*Primary Examiner* — Arun Williams
(74) *Attorney, Agent, or Firm* — Pillsbury Winthrop Shaw Pittman LLP

(57) ABSTRACT

The embodiments of the invention relate to a novel apparatus and method for a battery charging system in a shared environment, as well as for monitoring battery usage and tracking battery location. In one embodiment, the battery charging chute comprises a housing configured to receive a battery via an insertion slot and configured to dispense a battery through a dispensing slot. Within the housing, charging terminals are disposed is a spaced or continuous manner, to come in contact with the charging terminals on batteries inserted into the housing. Optionally, solenoid-controlled gates may be employed at the insertion slot and dispensing slot, to inhibit the removal or insertion of batteries from the incorrect location, to ensure that the battery with the longest residence time in the chute is dispensed to a user. The housing may also include a radio-frequency identification tag reader to permit inventorying and tracking of batteries inserted into the housing.

35 Claims, 1 Drawing Sheet

| | FOREIGN PATENT DOCUMENTS | |
|---|---|---|
| TW | I239673 | 9/2005 |
| TW | I253226 | 4/2006 |
| TW | I253774 | 4/2006 |
| TW | I256237 | 6/2006 |

OTHER PUBLICATIONS

Taiwanese Office Action issued in corresponding international application TW Appln. No. 96123467, dated Dec. 30, 2010.

* cited by examiner

BATTERY CHARGING APPARATUS HAVING A CHUTE AND METHOD OF RECHARGING A BATTERY

REFERENCE TO RELATED APPLICATION

This application is a continuation of U.S. patent application Ser. No. 11/478,336 filed Jun. 30, 2006 now U.S. Pat. No. 7,723,951 the contents of which are hereby incorporated by reference in their entirety.

FIELD OF INVENTION

In the illustrative embodiments, the invention relates to a device and method for the use and management of batteries for portable computing devices in a shared environment. The device, a chute for the insertion of depleted batteries, battery charging, inventory control, and dispensing of charged batteries, permits multiple users in an office or other industrial environment to rapidly swap depleted batteries for charged batteries quickly and efficiently, while the workplace operator maintains the ability to track the location and service life of batteries.

BACKGROUND

Handheld computing devices, such as cellular phones, palmtop, laptop, and similar portable computers have become extremely common. Many business rely on the use of such devices by their employees to conduct day-to-day operations. For example, insurance adjusters may take these devices into the field to store customer reports and digital photographs; medical personnel may use handheld devices in a hospital or clinical environment to acquire and store patient data, refer to patient charts, and have a wide variety of information available to them rapidly. Most business, for various reasons, are issuing employees portable computers, handheld email devices, and other similar devices.

The common feature of these devices is their use of batteries that are specifically designed for a specific computing platform. Unlike traditional alkali-cell batteries that can be purchased at retail locations and used immediately, batteries used in portable computing devices are generally removed from the device for which they are intended, connected to a charger, and then reinserted into the device. Alternatively, the battery may be charged in situ by connecting a power cord to the portable device, but that method of charging greatly diminishes the portability of the device and can require the device to remain within reach of an AC power outlet for the duration of the charging period, eliminating the advantages of a portable device. Often, the productivity of the workers is inhibited during the time when the batteries are charging.

Further, employers are often reluctant to issue multiple batteries to each employee, due to the high cost of specialized lithium, nickel metal hydride, and other batteries used in portable computing devices. Employers also have significant concerns regarding loss or theft of expensive batteries. For this reason, employers are often reluctant to provide a surplus of batteries to their employees, which would permit each employee to have a charged battery ready whenever the battery in their portable computing device is depleted.

DETAILED DESCRIPTION

Figure 1:
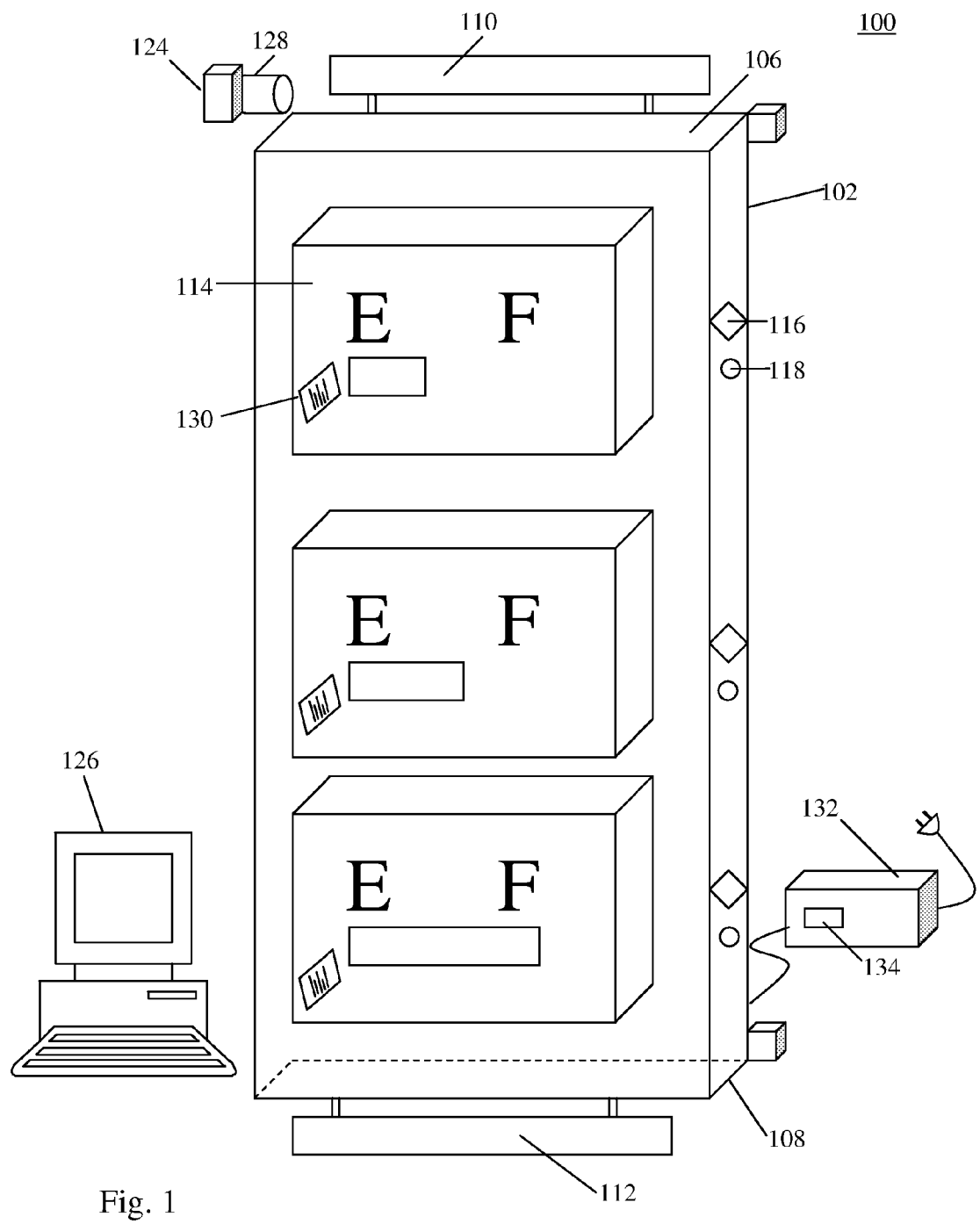
FIG. 1 is a representative illustration of an embodiment of the invention showing a housing having a plurality of rechargeable batteries disposed therein.

As used in the specification and claims, the singular forms "a", "an" and "the" include plural references unless the context clearly dictates otherwise. For example, the term "an array" may include a plurality of arrays unless the context clearly dictates otherwise.

As used herein, a "rechargeable battery" may be defined as any battery capable of supplying power to a portable computing device, provided that the charge within the cells that comprise the battery can be restored by applying a voltage potential across the terminals of the battery. Such cells include Nickel-Cadmium (NiCad), Nickel-Metal-Hydride (NiMHi), Lithium-Ion (Li-Ion), and Lithium-Polymer based technologies. Each cell may have a "rolled" configuration, a prismatic configuration, or other style of manufacture. Most portable electronic devices employ rechargeable batteries. The terms "battery" or "cell" may be used as alternatives to the term "rechargeable battery".

As also used herein, the term "housing" may refer to any structure that can be configured to receive and store a plurality of rechargeable batteries and include the necessary apparatus for charging the batteries. The apparatus may include a power converter for converting AC power to DC power; a microcontroller for applying a DC current and voltage across the terminals of a rechargeable battery; sensors, solenoid-actuated gates, and various indicators (both analog or digital) to indicate the charge status of batteries within the house.

As used herein, the term "gate" refers to mechanical and/or electrical means for controlling the movement and dispensing of batteries from the housing. Illustratively, the gate may be thought of as a mechanical or electrical barrier that inhibits the passage of a battery through an opening in the enclosed, slot-like chute that runs through a central axis of the housing. The gate may be a physical barrier that is opened and closed via a solenoid, a simple motor, or other equivalent means. This term, however, is not meant to imply any particular structure, but rather implies the function of inhibiting the passage of a physical object through an opening.

As used herein, the term "scanner" may refer to a bar code scanner used for inventory control. Bar code scanners use optical means to read coded sequences (consisting of a series of bars of varying thickness) to identify specific patterns. These patterns can be used to quickly and specifically identify objects.

As used herein, an "RIFD" scanner, or "Radio Frequency Identification Scanner" may be defined as a device which includes a computer program or application software executed on a CPU to enable the scanner to send and receive data wirelessly. The device may be capable of storing data, and performing information processing. A typical RFID scanner may have a central processing unit (CPU) or microprocessor in communication with a RF/data communication port. A data and instruction bus from a CPU is connected to a mass storage device and electronic memory. To read data from an RFID tag, an RF ("Radio Frequency") read signal is transmitted over a communication link to activate the RFID tag. The RFID tag retrieves the requested information from its memory and sends the data over the communication link to the communication port. In a simple example, the RFID scanner polls an RFID tag disposed on a rechargeable battery to get its identification number. The RF read signal requesting the item identification is sent to RFID tag by way of a communications link using a standard RFID communications protocol. The RFID tag retrieves the item identification from its memory and transmits the data back to the RFID scanner. The item identification data is sent to the CPU and is either locally stored in a mass storage device or electronic memory for further processing, or transmitted to another computer processing device. The item identifier can also be sent to a remote computer through a communication link.

As also used herein, the term "gate" can refer to any device configured to open or close in one direction or two directions. A gate may be configured to open in only a single direction, to permit the insertion of, for example, a battery into the housing, but not permit the removal of the battery from the housing via the same gate through which it was inserted. Gates may be spring-actuated or actuated by other mechanical means. Alternatively, gates may be activated by electronic means such as solenoids that are capable of being remotely controlled by a central processing unit.

As used herein, the term "indicia" refers to information. An embodiment of the invention contemplates the inclusion of indicia on the outer casing of a battery. The indicia may be identifying indicia stored electronically on an RFID tag, bar code, or simple text. Such identifying indicia may include information about a rechargeable battery, such as the in-service date, or it may be related to a user and include a name, employee number, or other information used for identification.

Another term used herein is "power converter" and may refer to any device used to rectify and regulate electricity for the purpose of supplying power to any electric devices used in any embodiment of the invention, including supplying power to batteries for purposes of recharging them. Used synonymously with "power converter" may be the terms "power supply", "power brick", and "power source".

As used herein, the term "microcontroller" refers to an electronic circuit for controlling the flow of electricity to a battery being recharged. As such, the term may be used interchangeably with the term "battery charger" or simply "charger". Many battery charging circuits are known in the art for these types of cells and usually include a shunt regulator to control the amount of charge that is delivered to the battery. Within the context of the various embodiments of this invention, however, microcontroller and/or battery charger refer to any device configured to apply a charge to a rechargeable battery. In preferable embodiments, the microcontroller can recognize when the battery has reached its maximum charge and reduce or cease the current/voltage delivered to the charging terminals. In more preferable embodiments, the rechargeable batteries are "smart batteries" that can interact with the microcontroller to charge the battery quickly and efficiently, recognize when the battery is not functioning properly, and account for thermal conditions which can occur during charging when a battery is being overcharged, being charged too rapidly, or has experienced some sort of failure.

As used herein, the term "shared environment" implies that more than one user may be inserting batteries or obtaining dispensed batteries from the charging apparatus.

As used herein, the term "chute" may refer to an opening that is sized to accommodate the insertion and removal of rechargeable batteries therethrough. The term may be used synonymously with aperture, cavity, or other expression to describe an opening within the housing that permits batteries to pass through the housing.

In one embodiment, the invention may be characterized as a device for recharging rechargeable batteries for use in a shared environment. The device includes a housing which can be made of most any material having the strength and rigidity to permit the insertion, storage, and retrieval of a number of rechargeable batteries. Most plastics, such as polycarbonates, are preferable due to their light weight, low cost, and strength. As well, polycarbonates can form housings of the many shapes or sizes that may be required to create housings capable of holding as little as a few or as many as a few dozen rechargeable batteries. An illustrative housing having a plurality of rechargeable batteries in differing charge stages is shown in FIG. 1.

Running through a central axis of the housing is a slot-like chute, configured to receive a rechargeable battery. The chute, and therefore the housing, can be made to a length to accommodate the storage of the desired number of batteries. Along a wall of the chute may be disposed a plurality of battery charging terminals to contact, or engage, charging terminals disposed on each of the rechargeable batteries stored within the housing. However, the size of the housing may be such that it may accommodate the storage of many batteries, while the number of terminals and their location may provide charging power to only the first few batteries inserted into the housing, to minimize cost and to avoid overcharging batteries that have been resident in the housing for a long period of time.

Also disposed within the chute may be thermal sensors, to monitor battery temperature. Battery temperature can often be a measure of the charge state of the battery, an indication that a battery is being charged too rapidly, or an indication that a cell within a battery has failed. Sensors within the battery itself may also have contacts on the outside of the battery which can engage terminals disposed within the chute to receive and transmit battery status information to a microcontroller that regulates the voltage and current applied to the terminals. Many algorithms are known in the art for maximizing the charge-rate of a battery. Some of these algorithms require the ability to monitor the status of the battery and modify the current and/or voltage applied to the charging terminals.

At a first end of the housing (at an end of the central axis) is an opening, or slot, that permits the insertion of a rechargeable battery into the chute. This may be referred to as an insertion slot. At another, or opposite, end of the housing is an opening, or slot, to permit the withdrawal, or dispensing, of charged rechargeable batteries. This may be referred to as the dispensing slot. Each of these slots may be configured with a gate that inhibits a user from inserting or removing a battery from the incorrect end of the charging device. This avoids the situation where a user removes an uncharged battery from the device, or inserts an uncharged battery into the location of the charging apparatus where another user may expect to be able to retrieve a recharged battery.

Controlling each gate may be a solenoid that is connected to a computer or other type of central processing unit. Those skilled in the art will recognize that there are many alternative to a solenoid, for controlling the movement of the gate, and that a solenoid is merely illustrative, and not exhaustive, of the available means. For example, a simple motor may be used to control battery dispensing (or open and close a gate), a piezoelectric system that inhibits removal may also be used. Other such mechanical and electrical systems are, of course, useful for this function. The central processing unit may be configured to determine whether a battery can be removed by a particular user, obtain and store identification information for a rechargeable battery and maintain a database of which battery is in the possession of a particular user, and perform other inventorying functions, such as analyzing the charge status of a battery to determine whether the battery is functioning correctly, has reached is usable service life, etc.

To supply power to the battery charging terminals, a microcontroller or other charging apparatus may be employed. In the simplest embodiment, the power supply is a regulated DC current supplied to the terminals at a specified voltage. Usually, the power supply will draw its power from an AC outlet and, thus, may also include a rectifier to convert AC power to DC power. Typically, AC/DC power converters for use with rechargeable batteries also incorporate a plurality of rectifiers, capacitors, and other circuitry well-know to those skilled in the art, to ensure that the DC power has a low ripple and relatively constant voltage. As well, most commercial charging circuits incorporate a microcontroller that both regulates the power and determines the most appropriate voltage and current to apply to the charging terminals, based on feedback from the battery sensors and thermal sensors. These devices usually have the capacity to charge numerous batteries simultaneously, but in embodiments where large numbers of batteries are to be stored in the housing, multiple controllers may be used.

One novel aspect of the invention is that, by design, the rechargeable battery that is dispensed to a user is the battery that has experienced the longest residence time within the housing (and thus has been charging as long, or longer, than any other battery stored within the housing). Since a user may only insert a depleted battery into the insertion slot and obtain a charged battery from the dispensing slot, the charging apparatus functions on a "first-in, first-out" principle. This forces the battery that is dispensed at the request of a user to be the battery with that has been in the apparatus for the longest period of time, unlike "bank"-style battery charging device which have a plurality of slots for inserting individual batteries and permit any battery within the "bank" to be removed at any time.

In another embodiment of the invention, the present charging apparatus is part of a method for charging batteries in a shared environment. By this method, users in a workplace, for example, may insert a depleted battery into the storage device via the insertion slot and remove a charged battery, whether it be fully charged or only partially charged depending on its residence time within the storage device and how much charge has been imparted to the battery during that time. By dispensing the battery that has the greatest residence time within the storage apparatus to the user, there is a degree of assurance that the user will be dispensed the battery with the greatest amount of charge. This may not, necessarily, be the case in situation where a user inserts a batter that is not is only partially depleted shortly after a user has insert a fully depleted battery, however. It is assumed, however, that users will generally wait until their electronic device provides them with a "low battery" warning prior to inserting a battery into the storage device for recharging.

Once a battery is inserted, it may or may not immediately begin charging. For example, a large charging apparatus may accommodate 100 batteries, but only provide power to the first 25 batteries inserted into the storage unit among the 100 batteries. As batteries are inserted and dispensed, the 25 batteries with the longest residence time in the unit may receive charging. Of course, if the user of the charging apparatus anticipates a rapid throughput of a large volume of batteries, the apparatus can be manufactured with a sufficiently sized charging circuit and microcontroller to charge all 100 batteries simultaneously.

In an embodiment of the invention wherein the apparatus is used, also, for inventory control and management, identifying indicia, such as bar codes or RIFD tags may be placed on the batteries. Included within the insertion slot or chute may be a bar code scanner or RFID reader that obtains identifying information from the battery. That information may be transmitted via standard networking methods or wireless networking methods to a computing device for further processing. That processing may include determining how long the battery has been in service, how many times it has been charged, the amount of charge in the battery when it was inserted, or other information. As well, a bar code scanner or RIFD scanner may also be used at the dispenser slot to determine how long a battery remained in the charging apparatus, the level of charge on the battery when it was dispensed, or other information that will assist the user of the device in battery management and to identify batteries which have surpassed their usable life or exhibit indications that they are not functioning within usable parameters.

The batteries used in connection with the present invention may also include an internal communications device for transmitting information about the battery's operation, such as 12C or SMBus. This internal communications link may also comprise a controller for handling the charging operations of the battery, as is described in the SMBus smartbattery specifications.

Illustratively, the SMBus is the most complete of all systems. It represents a large effort from the electronics industry to standardize on one communications protocol and one set of data. It is a two-wire interface system consisting of separate lines for the data and clock. The objective behind the SMBus battery is to remove the charge control from the charger and assign it to the battery. With a true SMBus system, the battery becomes the master and the charger serves as slave that must follow the instructions of the battery.

Battery-controlled charging is useful in situations where batteries that share the same footprint but contain different chemistries, requiring alternative charge algorithms, are contemplated for use with the present charging apparatus. With the SMBus, each battery receives the correct charge levels and terminates full-charge with proper detection methods, allowing the present charging apparatus to be compatible batteries used in multiple types of portable computing devices that share the same form factor. Further, the charging apparatus of an embodiment of the invention may be configured to receive batteries have differing physical size and attributes. If these batteries employ SMBus, however, the microcontroller can receive appropriate instructions from the battery, allowing each battery to be properly charged without limiting the microcontroller to function with a preset battery chemistry.

Illustratively, an SMBus battery may contain permanent and temporary data storage units. The permanent data is programmed into the battery at the time of manufacturing and should include a battery ID number, a battery type, a serial number, the manufacturer's name and the date of manufacture. The temporary data is acquired during use and consists of cycle count, user pattern and maintenance requirements. Some of this information may be renewed during the life of the battery.

The method of an embodiment of the invention may also permit inventory control by tracking the usage of batteries by various users. For example, in one embodiment, the invention may include an RIFD scanner, bar code scanner, keypad, or other data acquisition device wherein a user must present some credential or pass code that can be verified or authenticated prior to dispensing a battery. Illustratively, a user may have an ID card with an RFID tag that is issued by their employer. The users may be required to present their ID cards to a reader on the charging apparatus to identify themselves. The RIFD reader would acquire the user's identity and may send that to another computing device for processing or already be equipped with its own processing device for determining whether the user is authorized to use the charging apparatus. If the user's credentials cannot be verified, the charging station may not permit them to insert or remove batteries.

If the user's credentials are verified and include access to the charging apparatus, they user may then be prompted to insert their depleted battery. Once the depleted battery has been inserted into the insertion slot (after, for example, the processing device has actuated a solenoid on the gate covering the insertion slot and opened the gate), the user may then be prompted to remove a dispensed battery from the dispensing slot, after the processing device has actuated the solenoid on a gate covering the dispensing slot. As well, the processing device can then store information identifying the battery that was dispensed and to whom it was dispensed. Other information may be tracked, such as the length of time a particular user has a battery. As well, when in a workplace environment, RFID inventory control measures may also be implemented at the exits from the building which may be used to inhibit employees from leaving the workplace with tagged batteries or devices containing those batteries.

The invention claimed is:

1. A battery charging apparatus, comprising:
   a housing having an enclosed chute running though a central axis of the housing, the chute configured to permit batteries to pass through the housing; and
   a plurality of battery charging terminals disposed within the chute,
   wherein the chute is of a length sufficient to contain more than one rechargeable battery therein and wherein the battery charging terminals in the chute are configured to contact battery charging terminals disposed on the rechargeable battery.

2. The apparatus of claim 1, further comprising an insertion slot and a gate disposed at the insertion slot, the gate configured to prevent the removal of the rechargeable battery from the enclosed chute via the insertion slot.

3. The apparatus of claim 2, wherein the gate is controlled by a solenoid or an electric motor.

4. The apparatus of claim 1, further comprising a dispensing slot and a gate disposed at the dispensing slot, the gate configured to prevent the insertion of the rechargeable battery from the enclosed chute via the dispensing slot.

5. The apparatus of claim 4 wherein the gate is controlled by a solenoid or an electric motor.

6. The apparatus of claim 5, wherein the solenoid is controlled by a computer and the computer is configured to actuate a solenoid to open the gate and permit the removal of a rechargeable battery to an authorized user.

7. The apparatus of claim 1, further comprising a battery identification reader for receiving identification information from identifying indicia on the rechargeable battery.

8. The apparatus of claim 7, wherein the battery identification reader is a radio-frequency identification tag reader.

9. The apparatus of claim 7, further comprising a computer network interface for transmitting battery identification information to a computer.

10. The apparatus of claim 9, wherein the microcontroller is configured to regulate a voltage and a current supplied to the battery charging terminals.

11. The apparatus of claim 1, further comprising a user identification input device.

12. The apparatus of claim 11, wherein the user identification input device is a bar code scanner or radio frequency identification reader.

13. The apparatus of claim 11, further comprising a computer network interface for transmitting user identification information to a computer.

14. The apparatus of claim 1, further comprising a microcontroller.

15. The apparatus of claim 14, further comprising at least one thermal sensor disposed within the enclosed chute, wherein the at least one thermal sensor is configured to transmit the thermal state of the rechargeable battery to the microcontroller.

16. The apparatus of claim 14, further comprising at least one battery status sensor within the enclosed chute, wherein the at least one battery-status sensor is configured to transmit a status of the rechargeable battery to the microcontroller.

17. The apparatus of claim 16, wherein the microcontroller is configured to receive the status of the rechargeable battery and to regulate a voltage and a current supplied to the battery charging terminals.

18. A method for recharging batteries in a shared environment, comprising:
   inserting a rechargeable battery into a housing having an enclosed chute running though a central axis of the housing and a plurality of battery charging terminals disposed within the chute, the chute configured to permit the rechargeable battery to pass through the housing, wherein the housing is configured to receive and charge a plurality of individual rechargeable batteries; and
   charging the rechargeable battery.

19. The method of claim 18, further comprising scanning the rechargeable battery for identifying indicia.

20. The method of claim 19, further comprising reading information from identifying indicia disposed on the rechargeable battery.

21. The method of claim 20, wherein the identifying indicia includes information to indicate the date when the rechargeable battery was first used.

22. The method of claim 21, further comprising determining whether the rechargeable battery has exceeded its usable life, based on the length of time the rechargeable battery has been in service and/or the number of times the rechargeable battery has been recharged.

23. The method of claim 18, further comprising identifying a user attempting to insert or remove the rechargeable battery to or from the housing.

24. The method of claim 23, comprising determining whether the user is authorized to insert or remove a rechargeable battery from the housing.

25. The method of claim 24, comprising permitting a user to insert or remove a rechargeable battery from the housing.

26. The method of claim 18, further comprising monitoring a status of the rechargeable battery.

27. The method of claim 26, wherein the status includes a temperature of the rechargeable battery.

28. The method of claim 27, further comprising adjusting a charge-rate of the battery in response to the temperature of the battery.

29. The method of claim 26, wherein the status includes a charge level of the rechargeable battery.

30. The method of claim 29, further comprising adjusting a charge-rate of the battery in response to the charge level of the battery.

31. A battery charging device, comprising:
   a housing having an enclosed chute running though a central axis of the housing, the chute configured to permit batteries to pass through the housing;
   a plurality of battery status monitors disposed within the chute; and
   a plurality of battery charging terminals disposed within the chute for contacting corresponding battery charging terminals on a plurality of rechargeable batteries.

32. The device of claim 31, further comprising an RFID reader for obtaining the identity of a user.

33. The device of claim 31, further comprising an RFID reader for reading identifying indicia from an RFID tag on the rechargeable battery.

34. The device of claim 31, further comprising a computing device for authenticating the identity of the user.

35. The device of claim 34, further comprising a dispensing gate solenoid in communicating with the computing device.

* * * * *